United States Patent
Hellholm et al.

(10) Patent No.: US 10,967,924 B2
(45) Date of Patent: Apr. 6, 2021

(54) TRACKED VEHICLE COMPRISING A ROTATABLY ATTACHED BOGIE

(71) Applicant: BAE SYSTEMS HÄGGLUNDS AKTIEBOLAG, Örnsköldsvik (SE)

(72) Inventors: Björn Hellholm, Arnäsvall (SE); Leif Hallin, Umeå (SE); Jens Wågberg, Domsjö (SE); Daniel Engblom, Bonässund (SE); Max Thorén, Örnsköldsvik (SE); Anders Bodin, Örnsköldsvik (SE); Björn Nordberg, Örnsköldsvik (SE); Anders Sandin, Örnsköldsvik (SE)

(73) Assignee: BAE SYSTEMS HÄGGLUNDS AKTIEBOLAG, Örnskölds Vik (SE)

( * ) Notice: Subject to any disclaimer, the term of this patent is extended or adjusted under 35 U.S.C. 154(b) by 78 days.

(21) Appl. No.: 16/461,732

(22) PCT Filed: Nov. 9, 2017

(86) PCT No.: PCT/SE2017/051116
§ 371 (c)(1),
(2) Date: May 16, 2019

(87) PCT Pub. No.: WO2018/093317
PCT Pub. Date: May 24, 2018

(65) Prior Publication Data
US 2019/0359268 A1 Nov. 28, 2019

(30) Foreign Application Priority Data
Nov. 18, 2016 (SE) .................................. 1651514-0

(51) Int. Cl.
*B62D 55/116* (2006.01)
*B62D 55/112* (2006.01)
(Continued)

(52) U.S. Cl.
CPC ........ *B62D 55/112* (2013.01); *B62D 55/0655* (2013.01); *B62D 55/10* (2013.01); *B62D 55/116* (2013.01)

(58) Field of Classification Search
CPC .. B62D 55/0655; B62D 55/10; B62D 55/116; B62D 55/065; B62D 55/112; B60G 5/06;
(Continued)

(56) References Cited

U.S. PATENT DOCUMENTS 2,496,136 A * 1/1950 Smith .................... B62D 55/10
305/139
3,367,726 A 2/1968 Tucker
(Continued)

FOREIGN PATENT DOCUMENTS

CA 990770 A1 8/1976
CN 205440590 U 8/2016
(Continued)

OTHER PUBLICATIONS

Office Action received for Swedish Patent Application No. 1651514-0, dated Jun. 1, 2017, 4 pages.
(Continued)

*Primary Examiner* — Toan C To
(74) *Attorney, Agent, or Firm* — Morrison & Foerster LLP

(57) ABSTRACT

The invention relates to a tracked vehicle (11) comprising a vehicle body (30), at least one track assembly (21) and a suspension device (S). Said track assembly (21) is arranged to be supported by said vehicle body (30) by means of said suspension device (S), said track assembly comprising a track support beam (22) for supporting a plurality of road wheels (23, 23*a*), an endless track (25) being disposed around said road wheels. Said suspension device (S) comprises a bogie arrangement (50) rotatably attached to a (Continued)

fastening point (P0) of said vehicle body (30) about an axis of rotation (Z0) transversal to the longitudinal extension of said track assembly (21) and attached to said track support beam (22) in connection to at least two fastening points (P1, P2) so that the track support beam (22) is allowed to rotate in a rotational plane extending along the longitudinal extension of said track support beam (22) about said axis of rotation.

11 Claims, 7 Drawing Sheets

(51) Int. Cl.
*B62D 55/065* (2006.01)
*B62D 55/10* (2006.01)

(58) Field of Classification Search
CPC ...... B60G 5/01; B60G 17/016; B60G 21/067; B60G 2300/32; B60G 2800/01; B60G 2800/912; B60G 2206/0112
USPC ........................................ 180/9.52; 280/6.154
See application file for complete search history.

(56) References Cited

U.S. PATENT DOCUMENTS

| | | | | |
|---|---|---|---|---|
| 3,711,164 | A * | 1/1973 | Chaumont | B62D 55/108 305/127 |
| 3,841,424 | A * | 10/1974 | Purcell | B62D 55/14 180/9.5 |
| 4,953,919 | A * | 9/1990 | Langford | B62D 55/06 305/131 |
| 5,452,949 | A * | 9/1995 | Kelderman | B62D 49/0635 180/9.44 |
| 7,690,738 | B2 * | 4/2010 | Wilt | B62D 55/116 305/133 |
| 9,643,667 | B2 * | 5/2017 | Hansen | B62D 55/10 |
| 2003/0222432 | A1 * | 12/2003 | Bowers | B60G 21/055 280/677 |
| 2015/0166133 | A1 * | 6/2015 | Eavenson, Sr. | B62D 55/108 305/134 |
| 2016/0068205 | A1 | 3/2016 | Hellholm et al. | |
| 2018/0162465 | A1 * | 6/2018 | Visscher | B62D 55/14 |
| 2019/0359269 | A1 * | 11/2019 | Hellholm | B62D 55/116 |

FOREIGN PATENT DOCUMENTS

| | | |
|---|---|---|
| EP | 1308378 A1 | 5/2003 |
| JP | 4-262708 A | 9/1992 |
| JP | 9-154310 A | 6/1997 |
| JP | 411029950 A | 5/1999 |
| RU | 2025378 C1 | 12/1994 |
| RU | 2126331 C1 | 2/1999 |
| RU | 2144879 C1 | 1/2000 |
| WO | 2014/182235 A1 | 11/2014 |

OTHER PUBLICATIONS

Swedish Search Report received for Swedish Patent Application No. 1651514-0, dated Jun. 6, 2017, 2 pages.
International Search Report received for PCT Patent Application No. PCT/SE2017/051116, dated Jan. 5, 2018, 4 pages.
International Written Opinion of the International Searching Authority received for PCT Patent Application No. PCT/SE2017/051116, dated Jan. 5, 2018, 5 pages.
Extended European Search Report received for European Patent Application No. 17872301.1, dated May 8, 2020, 9 pages.
Office Action received for Russian Patent Application No. 2019118652/11, dated Nov. 25, 2020, 7 pages.
Russian Search Report received for Russian Patent Application No. 2019118652/11, dated Nov. 25, 2020, 5 pages.

\* cited by examiner

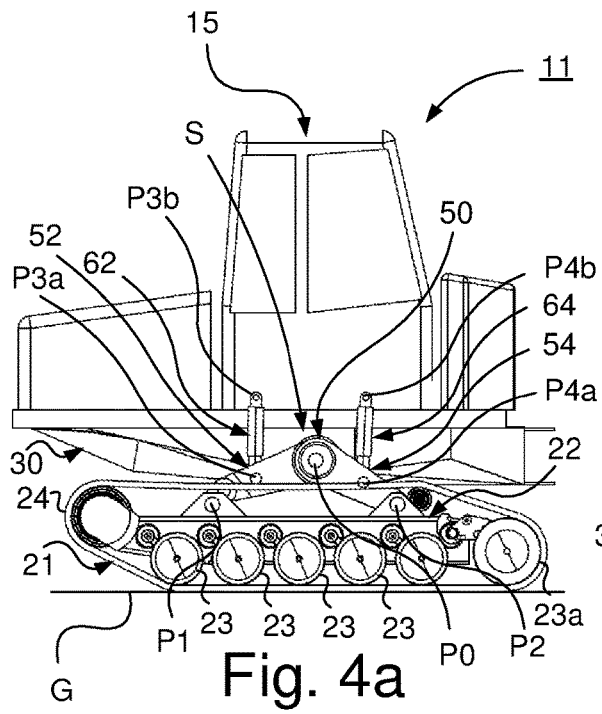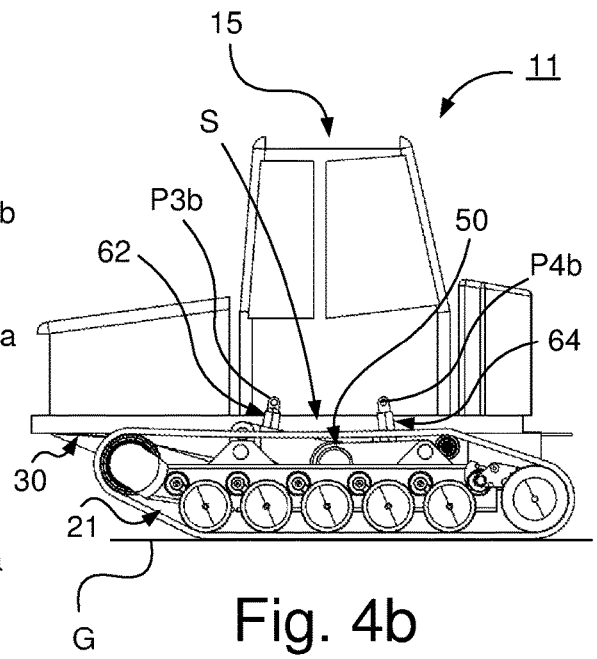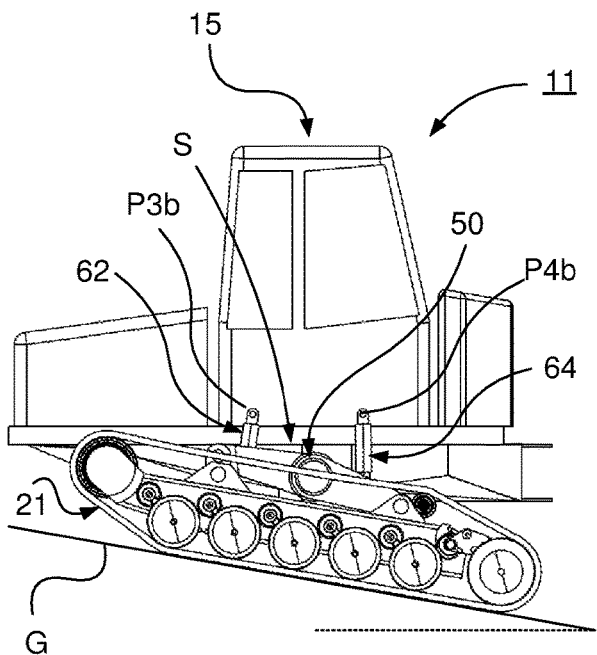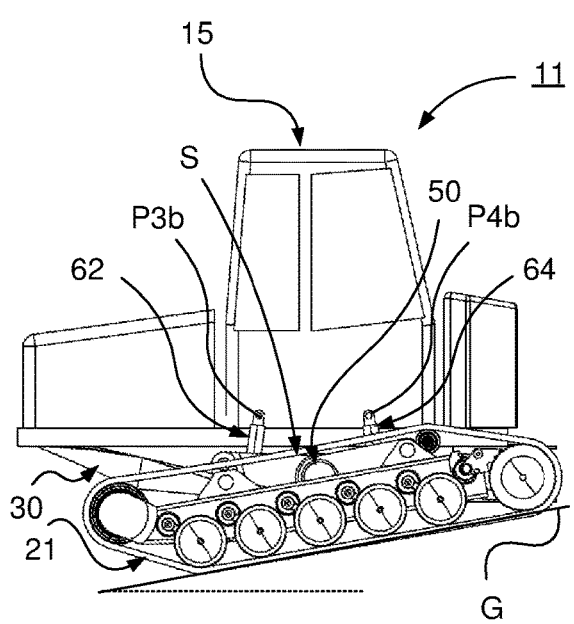

10,967,924 B2

TRACKED VEHICLE COMPRISING A ROTATABLY ATTACHED BOGIE

CROSS REFERENCE TO RELATED APPLICATIONS

This application is a U.S. National Phase patent application under 35 U.S.C. § 371 of PCT/SE2017/051116, filed Nov. 9, 2017, which claims priority to Sweden Patent Application No. SE 1651514-0, filed Nov. 18, 2016, the disclosures of which are incorporated herein by reference in their entirety.

TECHNICAL FIELD

The present invention relates to a tracked vehicle according to the preamble of claim 1.

BACKGROUND

Tracked vehicles normally comprise a pair of track assemblies, where each track assembly of the pair of track assemblies comprises a track support beam, a drive wheel, a plurality of support wheels and an endless track running over the drive wheel and said plurality of support wheels. Said drive wheel and said plurality of support wheels are rotatably secured to said track support beam.

In order to improve mobility and comfort of such a tracked vehicle, the vehicle needs to be provided with a suspension device.

WO2014182235 discloses a tracked vehicle comprising a vehicle body and a track assembly arranged to be supported by said vehicle body by means of a suspension device, said track assembly comprising a track support beam for supporting a plurality of road wheels, an endless track being disposed around said road wheels. Said suspension device comprises a track assembly suspension configuration configured to connect the track assembly pair with a centrally arranged vehicle body in the shape of a vehicle body.

Said track assembly suspension configuration comprises a front trailing A-arm configuration and a rear trailing link arm configuration for the respective track assembly. The front trailing A-arm configuration is at one end rotatbly connected at a lower attachment of a front region of said vehicle body and at the other end at a front region of said track support beam, and the rear trailing link arm configuration is at one end rotatably connected at a lower attachment of a rear region of said vehicle body and in another end at a rear region of said track support beam. Said track assembly suspension configuration comprises a pair of hydraulic cylinders for the respective track assembly.

The suspension device according to WO2014182235 also comprises a support wheel suspension configuration configured to resiliently secure said support wheels to said track support beam, wherein the track assembly suspension configuration is configured to cooperate with the support wheel suspension configuration based on the force acting on the track assembly.

There is however a need to present improvements in suspension devices for tracked vehicles.

OBJECT OF THE INVENTION

An object of the present invention is to provide a tracked vehicle comprising a suspension device which provides a robust construction with good mobility and comfort when driving the vehicle A further object of the present invention is to provide a tracked vehicle with a suspension device that facilitates the transport of cargo when driving in rough terrain for enabling increased productivity of a tracked work vehicle, such as a forestry vehicle.

SUMMARY OF INVENTION

These and other objects, which will become apparent from the following description, are achieved by a tracked vehicle as set out in the appended independent claim. Preferred embodiments of the tracked vehicle are defined in the appended dependent claims.

Specifically an object of the invention is achieved by a tracked vehicle comprising a vehicle body, at least one track assembly and a suspension device. Said track assembly is arranged to be supported by said vehicle body by means of said suspension device. Said track assembly comprises a track support beam for supporting a plurality of road wheels, an endless track being disposed around said road wheels. Said suspension device comprises a bogie arrangement rotatably attached to a fastening point of said vehicle body about an axis of rotation transversal to the longitudinal extension of said track assembly and attached to said track support beam in connection to at least two fastening points so that the track support beam is allowed to rotate in a rotational plane extending along the longitudinal extension of said track support beam about said axis of rotation.

By arranging a suspension device with such a bogie arrangement a robust construction with good mobility and comfort is provided. Hereby efficient tilting of the vehicle body relative to said track assembly is facilitated. Thus, the vehicle body may be held essentially horizontal when driving in slopes. Transport of cargo when driving in rough terrain is hereby facilitated, thus enabling increased productivity of a tracked work vehicle, such as a forestry vehicle.

The tracked vehicle comprises may comprise one or more tracked vehicle units. The tracked vehicle comprises according to an embodiment more than one tracked vehicle unit, said vehicle units being articulately connected to each other. The tracked vehicle is according to an embodiment a tracked articulated vehicle.

The tracked vehicle comprises opposite track assemblies, a right track assembly and the opposite track assembly constituting a left track assembly, said right and left track assemblies constituting a track assembly pair. For a tracked vehicle comprising more than one vehicle unit, each vehicle unit comprises such a track assembly pair.

Said track support beam is further arranged to support at least one drive wheel and a tension wheel.

Said bogie arrangement is thus arranged to be rotatably mounted to said vehicle body about an axis of rotation across a main direction of extension of said track assembly and thus a main direction of extension of the track support beam. Said bogie arrangement is rotatably attached to said vehicle body at a single fastening point for said axis of rotation, here denoted centre fastening point. Said bogie arrangement is rotatably attached to said vehicle body by means of a fastening element of said bogie arrangement such as a tap/axle.

Said bogie arrangement is rotatably attached to said track support beam in connection to said at least two fastening points, said at least two fastening points being arranged at a distance from each other along the longitudinal extension of the track support beam. Said at least two fastening points are according to an embodiment arranged at a distance from each other along the longitudinal extension of the track support beam at essentially the same level in connection to the track support beam with regard to the extension of the track support beam orthogonal to the longitudinal and transversal extension of the track support beam, i.e. essentially the same horizontal level along the track support beam when the track assembly pair of the vehicle is horizontally arranged on the ground.

According to an embodiment of the tracked vehicle said bogie arrangement comprises two bogie arms pivotably connected to each other and rotatably attached to a respective fastening point of said at least two fastening points of said track support beam so that said bogie arms are allowed to move relative to each other in said rotational plane. Said bogie arrangement is thus an articulated bogie arrangement. By thus providing an articulated bogie arrangement with two bogie arms pivotably connected to each other and rotatably attached to a respective fastening point of said at least two fastening points mobility and comfort of the tracked vehicle may be further improved. Hereby the vehicle body may be raised and lowered relative to the track assembly. Hereby the respective side of the vehicle body may be raised relative to the track assembly such that one side of the vehicle body is raised relative to the track assembly of that side and/or the opposite side of the vehicle body is lowered relative to the track assembly of that side such that the vehicle is tilted in the transversal plane. Hereby mobility and comfort is further improved.

According to an embodiment of the tracked vehicle said bogie arrangement comprises distance adjustment means for allowing a distance change between at least one of said fastening points in the track support beam and said fastening point in the vehicle body for facilitating said allowance of movement of said bogie arms relative to each other in said rotational plane.

According to an embodiment of the tracked vehicle said two bogie arms in one of their respective end portions are rotatably attached to the vehicle body in said fastening point of the vehicle body such that they are rotatable relative to each other about said axis of rotation and in their respective other end portions are rotatably attached to a respective fastening point of said at least two fastening points in the track support beam, about a respective axis of rotation transversal to the longitudinal extension of said track assembly. Hereby a robust and efficient arrangement for providing a movement of the track assembly relative to the vehicle body is obtained. Thus, hereby tilting of the vehicle body relative to the track assembly pair in said rotational plane about said axis of rotation transversal to the longitudinal extension of the track support beam, raising and lowering of the vehicle body relative to the track assembly pair, and tilting of the vehicle body relative to the track assembly pair in the transversal plane of the track assembly pair of the tracked vehicle may be efficiently and robustly obtained.

According to an embodiment said two bogie arms are, in one of their respective end portions, rotatably attached to the vehicle body in said fastening point of the vehicle body via an axle. The bogie arm configuration thus comprises two bogie arms, a first bogie arm and a second bogie arm. The first bogie arm is according to this embodiment rotatably connected to said axle at an end portion of said first bogie arm and is extending essentially perpendicular away from said axle. The second bogie arm is according to this embodiment rotatably connected to said axle at an end portion of said second bogie arm and is extending essentially perpendicular away from said axle. The first bogie arm and second bogie arm are according to an embodiment configured to be rotatable about said axel in essentially the same rotational plane.

The first bogie arm is according to an embodiment rotatably connected to one of said at least two fastening points in the track support beam at an opposite end portion of said first bogie arm, said connection according to an embodiment being via a tap. The second bogie arm is according to an embodiment rotatably connected to another of said at least two fastening points in the track support beam at an opposite end portion of said second bogie arm, said connection according to an embodiment being via a tap.

The first bogie arm is at said opposite end portion according to an embodiment rotatably connected to a front fastening point of said at least two fastening points in the track support beam and the second bogie arm is at said opposite end portion according to an embodiment rotatably connected to a rear fastening point of said at least two fastening points in the track support beam. The front fastening point is thus arranged in connection to a front portion of the track support beam and the rear fastening point is arranged in connection to a rear portion of the track support beam.

The first bogie arm thus constitutes a front bogie arm arranged to extend forwardly in the longitudinal direction of said track support beam from its end portion rotatably connected to said centre fastening point, e.g. axle, in the vehicle body to its opposite end portion rotatably connected to said front fastening point of the track support beam.

The second bogie arm thus constitutes a rear bogie arm arranged to extend rearwardly in the longitudinal direction of said track support beam from its end portion rotatably connected to said centre fastening point, e.g. axle, in the vehicle body to its opposite end portion rotatably connected to said rear fastening point of the track support beam.

According to an embodiment of the tracked vehicle said adjustment means comprises a crank throw configuration for at least one of said rotatable attachments of said other end portion of a bogie arm and a fastening point of said at least two fastening points. By thus providing a crank throw configuration a robust and efficient arrangement for allowing said distance changes is provided. Thus, hereby tilting of the vehicle body relative to the track assembly pair in said rotational plane about said axis of rotation transversal to the longitudinal extension of the track support beam, raising and lowering of the vehicle body relative to the track assembly pair, and tilting of the vehicle body relative to the track assembly pair in the transversal plane of the track assembly pair of the tracked vehicle may be efficiently and robustly obtained.

The crank throw configuration may comprise or be constituted by a crank pin. The crank throw configuration is according to an embodiment arranged at an opposite end portion of said first bogie arm and/or said second bogie arm.

According to an embodiment of the tracked vehicle said adjustment means comprises a slide configuration for at least one of said rotatable attachments of said other end portion of a bogie arm and a fastening point of said at least two fastening points. By thus providing a slide configuration a robust and efficient arrangement for allowing said distance changes is provided. Thus, hereby tilting of the vehicle body relative to the track assembly pair in said rotational plane about said axis of rotation transversal to the longitudinal extension of the track support beam, raising and lowering of the vehicle body relative to the track assembly pair, and tilting of the vehicle body relative to the track assembly pair in the transversal plane of the track assembly pair of the tracked vehicle may be efficiently and robustly obtained.

The slide configuration may comprise a slide rail, a slide pad or the like. The slide configuration is according to an embodiment arranged in at least one of said fastening points of said two fastening points of said track support beam. Thus, according to an embodiment at least one of said fastening points of said two fastening points of said track support beam comprises, is comprised in or constitutes a slide configuration for allowing said distance change between at least one of said fastening points in the track support beam and said fastening point in the vehicle body.

The slide configuration is according to an embodiment arranged in said opposite end portion of at least one of said first bogie arm and second bogie arm of said bogie arrangement for allowing said distance change between at least one of said fastening points in the track support beam and said fastening point in the vehicle body.

According to an embodiment the tracked vehicle said suspension device further comprises a suspension configuration for damping the movement of said bogie arrangement and hence the movement of the track assembly relative to the vehicle body and/or for controlling the position of the bogie arrangement and hence the position of the track assembly relative to the vehicle body.

By thus providing a suspension configuration for damping the movement of said bogie arrangement and hence the movement of the track assembly relative to the vehicle body comfort and mobility may be improved in that impacts on the track assembly during drive of the vehicle are reduced/absorbed due to said damping of the movement of said bogie arrangement. Herby load on the vehicle structure in form of vibrations, shocks and impacts are reduced.

By thus providing a suspension configuration for controlling the position of the bogie arrangement and hence the position of the track assembly relative to the vehicle body mobility and comfort of the vehicle may be improved in that tilting of the vehicle body relative to the track assembly pair in said rotational plane about said axis of rotation transversal to the longitudinal extension of the track support beam, raising and lowering of the vehicle body relative to the track assembly pair, and tilting of the vehicle body relative to the track assembly pair in the transversal plane of the track assembly pair of the tracked vehicle may be controlled based on the configuration of ground on which the tracked vehicle is travelling. Thus driving in terrain involving slopes such as downhill slopes, uphill slopes, side slopes and/or other formations of the ground comprising e.g. obstacles will hereby be improved.

According to an embodiment of the tracked vehicle said a suspension configuration is arranged between the vehicle body and at least one of said two bogie arms for damping the movement of said at least one bogie arm and/or controlling the position of said at least one bogie arm in said rotational plane. Hereby an efficient and robust arrangement for facilitating said damping and control is obtained.

According to an embodiment of the tracked vehicle said a suspension configuration comprises at least one hydraulic cylinder.

Said a suspension configuration comprises according to an embodiment a pair of hydraulic cylinders for the respective track assembly of the tracked vehicle. Said pair of hydraulic cylinders for the respective track assembly of the tracked vehicle comprises a front hydraulic cylinder connected between the front bogie arm and a front fastening point of the vehicle body and a rear hydraulic cylinder connected between the rear bogie arm and a rear fastening point of the vehicle body.

The front hydraulic cylinder is at one end portion rotatably attached to the front bogie arm and at an opposite end portion rotatably attached to said front fastening point of the vehicle body. The rear hydraulic cylinder is at one end portion rotatably attached to the rear bogie arm and at an opposite end portion rotatably attached to said rear fastening point of the vehicle body.

Said front hydraulic cylinder and rear hydraulic cylinder are arranged to be connected such that hydraulic flow is distributed between the front and the rear hydraulic cylinder based on the force acting on the front and rear hydraulic cylinder. This facilitates the bogie function of the track assemblies of the vehicle such that the vehicle body of the tracked vehicle to a greater extent can be withheld in parallel with the ground plane during propulsion of the vehicle, whereby comfort is improved. Furthermore, the mobility of the vehicle is hereby improved, thus enabling passage over larger obstacles and ditches.

According to an embodiment of the tracked vehicle said tracked vehicle is an articulated vehicle comprising a first vehicle units and a second vehicle unit pivotably connected to the first vehicle unit via an articulation joint, each of said vehicle units comprising a vehicle body and two track assemblies connected to respective sides of said vehicle body by means of a suspension device comprising said bogie arrangement.

According to an embodiment of the tracked vehicle said tracked vehicle is a forestry vehicle.

According to an embodiment of the tracked vehicle said tracked vehicle is a forwarder.

According to an aspect the present invention also relates to a suspension device for a tracked vehicle a set out in the embodiments above relating to a tracked vehicle.

BRIEF DESCRIPTION OF THE DRAWINGS

For a better understanding of the present invention reference is made to the following detailed description when read in conjunction with the accompanying drawings, wherein like reference characters refer to like parts throughout the several views, and in which:

FIG. 3b schematically illustrates a perspective view of the track assembly with a suspension device in FIG. 3a;

FIG. 4a schematically illustrates a side view of a tracked vehicle with a suspension device where the vehicle body is raised relative to the track assembly;

FIG. 4b schematically illustrates a side view of the tracked vehicle in FIG. 4a where the vehicle body is lowered relative to the track assembly;

FIG. 4c schematically illustrates a side view of the tracked vehicle in FIG. 4a in an uphill slope where the vehicle body is tilted to a horizontal position relative to the track assembly;

FIG. 4d schematically illustrates a side view of the tracked vehicle in FIG. 4a in a downhill slope where the vehicle body is tilted to a horizontal position relative to the track assembly;

DETAILED DESCRIPTION OF THE INVENTION

Hereinafter the term "bogie arrangement" refers to a coherent structural element for suspension of ground engaging members or thereto connected parts of land vehicles, said coherent structural element comprising at least two arms, denoted as bogie arms, which arms in one end are configured to be rotatably attached to the vehicle body of the vehicle, either directly or via a structural element fixedly attached to the vehicle body, in a common fastening point about which said coherent structural element is allowed to pivot/rotate in a plane extending in the longitudinal direction of the vehicle about an axis extending in the transversal direction of the vehicle essentially perpendicular to said longitudinal direction in alignment with said fastening point. Said plane is thus vertical plane when the vehicle is standing on a horizontal ground plane.

Hereinafter the term "articulated bogie arrangement" refers to a bogie arrangement as defined above, wherein said bogie arms are pivotably connected to each other and so that said bogie arms are allowed to move relative to each other in said rotational plane.

Hereinafter the term "track support beam" refers to a structural element arranged to support ground-engaging means such as e.g. an endless track as well as drive wheel and support wheels.

Hereinafter the term "track assembly" refers to a unit of the tracked vehicle comprising track support beam, drive wheel and support wheels as well as a circumferential endless track, which unit is arranged to comprise ground-engaging means and configured to propel the vehicle and thus form at least part of a drive unit of the tracked vehicle.

Hereinafter the term "track assembly pair" refers to opposite track assemblies of a vehicle unit of the vehicle, one track assembly constituting a right track assembly and the opposite track assembly constituting a left track assembly.

Hereinafter the term "articulated vehicle" refers to a vehicle with at least a front and a rear vehicle unit which are pivotable relative to each other about at least one joint.

Hereinafter the term "vehicle body" refers to any structure of a vehicle configured to support track assemblies of a tracked vehicle and may comprise or constitute the vehicle chassis. The term "vehicle body" may refer to a vehicle frame, one or more beams or the like.

Figure 1:
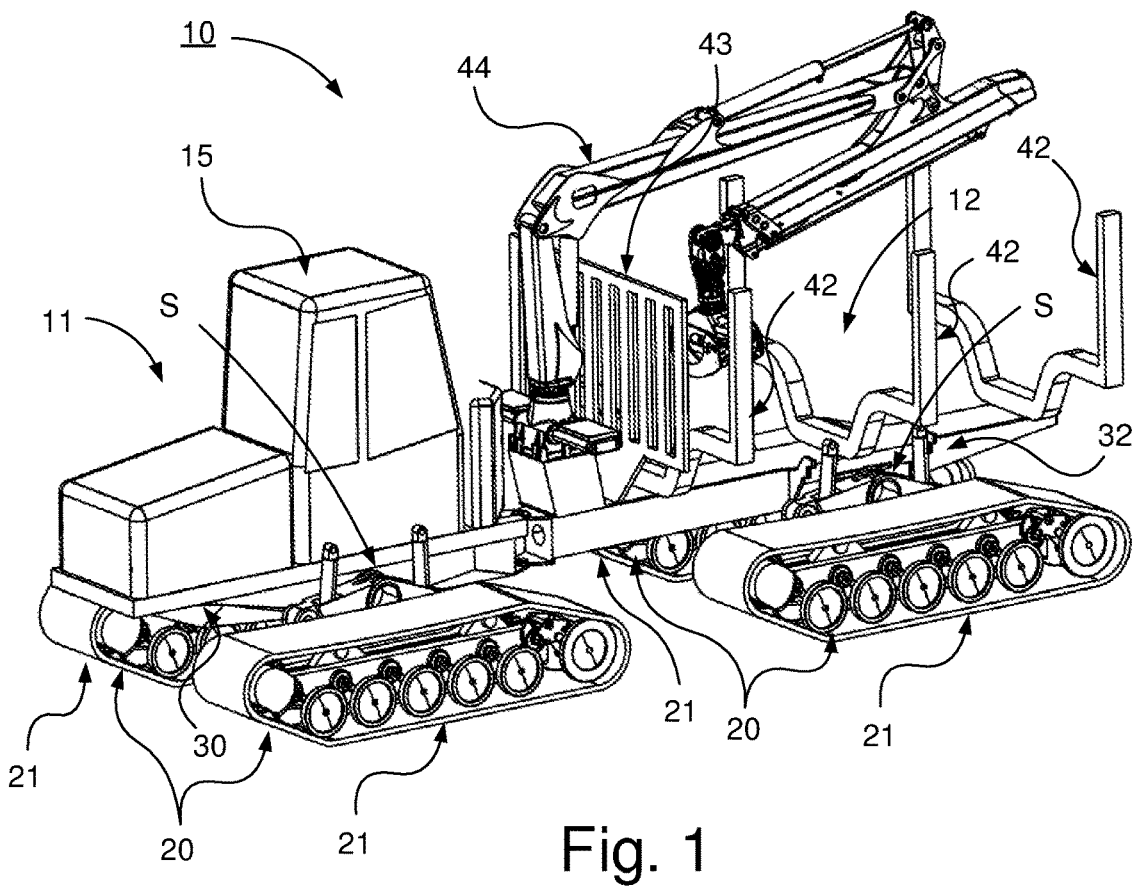
FIG. 1 schematically illustrates a perspective view of a tracked vehicle according to an embodiment of the invention.

Referring to FIG. 1, a tracked vehicle 10 according to the present invention is illustrated, provided with a front vehicle unit 11 and a rear vehicle unit 12.

Each of the front and rear vehicle unit comprises a track assembly pair 20. Said track assembly pair 20 is constituted by or comprised of a drive unit pair. Said track assembly pair 20 comprises two track assemblies 21 arranged on opposite sides of the vehicle 10. The respective track assembly 21 is constituted by or comprised of a drive unit. The respective track assembly 21 is constituted by a driving track assembly and is arranged for propulsion of the vehicle. The respective track assembly pair 20 is connected to an intermediate vehicle body 30, 32, such as a chassis beam. Thus, the front vehicle unit 11 comprises a vehicle body 30 and the rear vehicle unit 12 comprises a vehicle body 32.

Each of the front and rear vehicle unit 11, 12 comprises a suspension device S for the respective track assembly 21. The respective track assembly 21 of the respective vehicle unit 11, 12 is thus arranged to be supported by the respective vehicle body 30, 32 by means of said suspension device S. The suspension device S is described in more detail with reference to FIGS. 3a-c and 4a-d.

Said vehicle body 30, 32 of the respective vehicle unit 11, 12 is arranged to support a vehicle structure, e.g. in the form of a vehicle cabin, power supplies, load carrying structure and a crane.

According to this configuration of the vehicle 10, the vehicle body 30 of the front vehicle unit 11 is arranged to support a vehicle cabin 15 and a power supply, such as an internal combustion engine, where the internal combustion engine according to one embodiment is constituted by a diesel engine.

According to this configuration of the vehicle 10, the vehicle body 32 of the rear vehicle unit 12 is arranged to support a U-beam configuration 42 or a load beam configuration 42 for supporting timber and a loading gate 43. The vehicle body 32 of the rear vehicle unit 12 is according to this embodiment also arranged to support a crane 44 for loading/unloading of timber.

The exemplified vehicle 10 is a tracked forestry vehicle in the form of a forwarder intended to transport timber from a harvesting site to a collection site. The vehicle 10 according to the present invention may be constituted by any suitable tracked vehicles. According to one embodiment, the vehicle 10 is a harvester intended for cutting timber.

The exemplified vehicle 10 is a diesel-electric driven vehicle. The vehicle 10 may according to one alternative have any suitable power supply for the propulsion of the vehicle. The vehicle 10 is according to one alternative a hybrid-powered vehicle. The vehicle 10 is according to one alternative electrically driven, where power according to one alternative is supplied by means of an energy storage device such as a battery unit, fuel cell or capacitor unit. The vehicle comprises a suspension device described below with reference to FIGS. 2, 3a-b, 4a-d and 5a-c.

Figure 2:
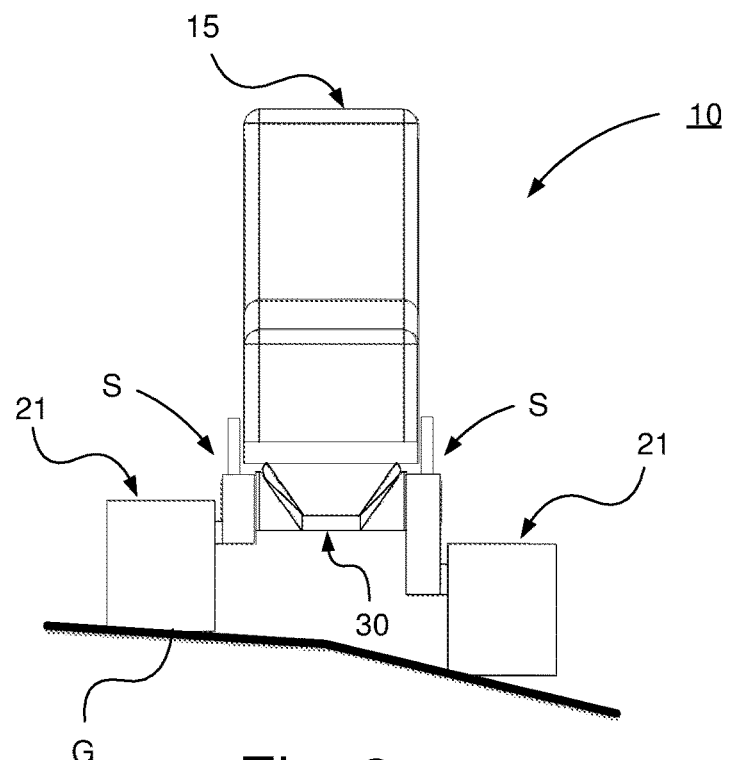
FIG. 2 schematically illustrates a front view of the tracked vehicle in FIG. 1.

FIG. 2 schematically illustrates a front view of the tracked vehicle in FIG. 1 during driving in a side slope of a ground G, wherein control of the vehicle suspension device S enables the vehicle body 30 of the vehicle 10 and thus the cab 15 of the vehicle to be kept substantially horizontal by raising/lowering the track assemblies 21 of the vehicle 10.

Figure 3A:
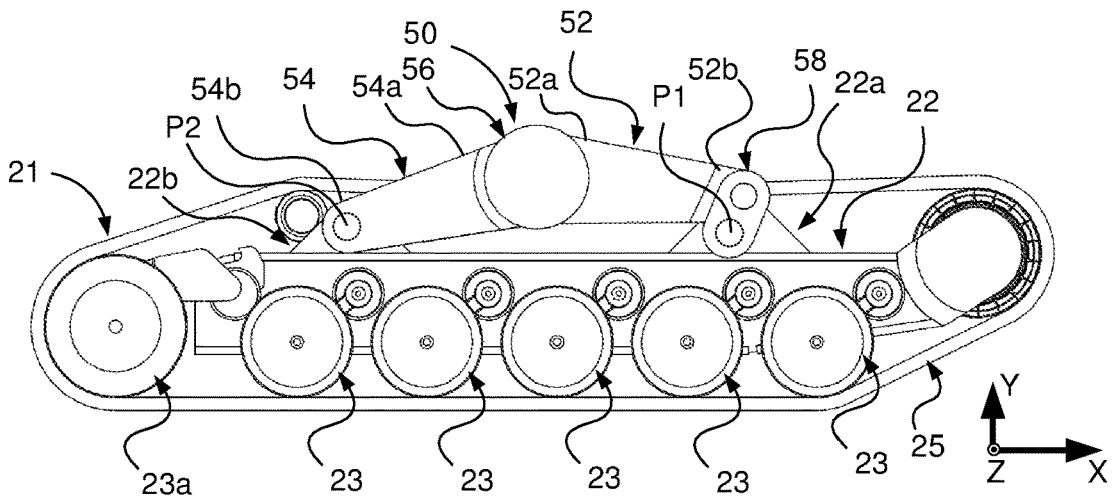
FIG. 3a schematically illustrates a side view of a track assembly with a suspension device according to an embodiment of the present invention.
Figure 3B:
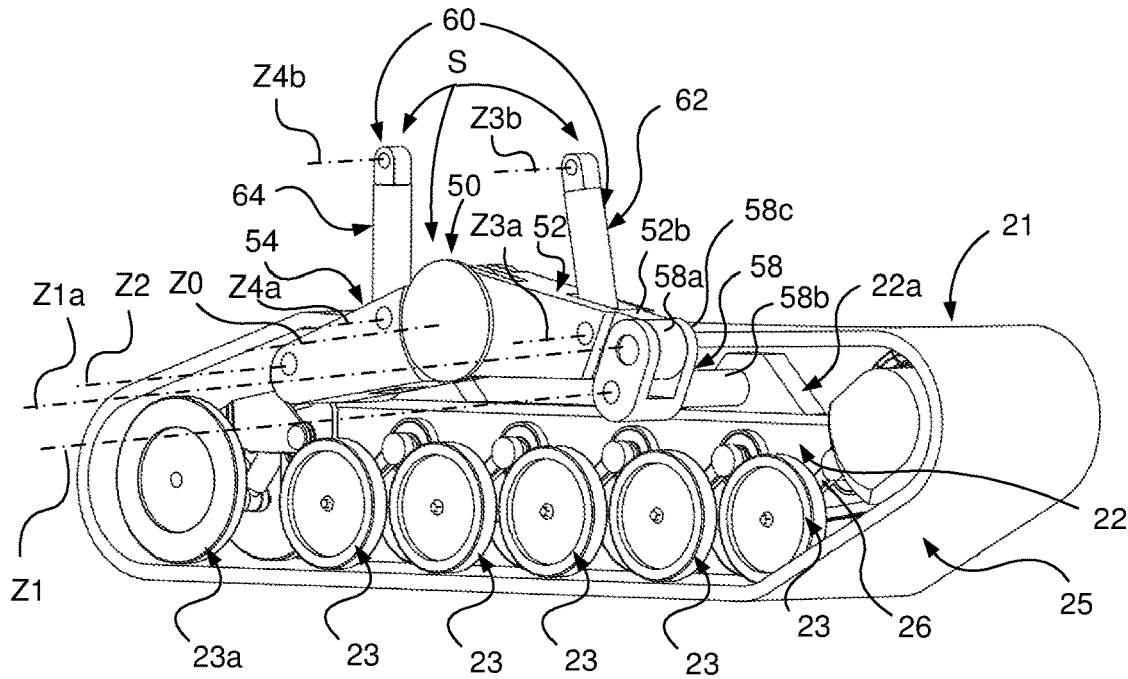
Figure 3C:
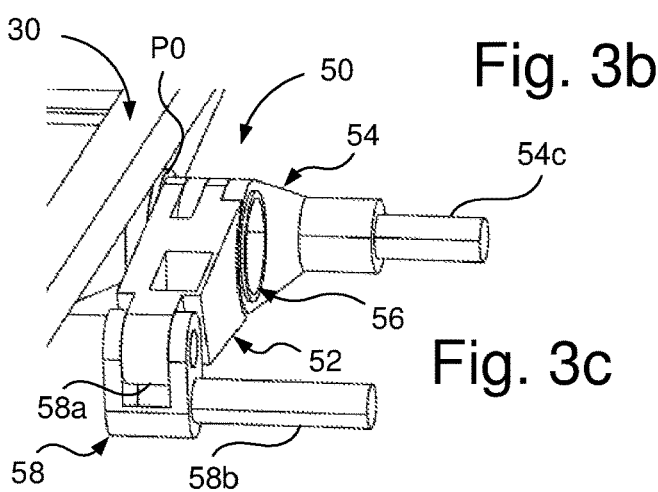
FIG. 3c schematically illustrates a perspective view of the suspension device in FIG. 3a attached to a vehicle body.

FIG. 3a schematically illustrates a side view of a track assembly 21 with a suspension device S according to an embodiment of the present invention, FIG. 3b schematically illustrates a perspective view the track assembly 21 with parts of the device suspension in FIG. 3a, and FIG. 3c schematically illustrates a perspective view of the suspension device in FIG. 3a attached to a vehicle body.

The track assembly 21 is together with another track assembly forming a track assembly pair as described with reference to FIG. 1 arranged to drive a tracked vehicle/tracked vehicle unit.

The track assembly 21 comprises a track support beam 22, which is here constituted by a skid beam. The track assembly further comprises a set of support wheels 23, 23a, a drive wheel 24, and an endless track 25. Said endless track 25 is arranged to run over the drive wheel 24 and said set of support wheels 23, 23a. The track assembly 21 has one drive wheel but may have more than one drive wheel.

Said set of support wheels 23, 23a and the drive wheel 24 are arranged to be rotatably supported by said track support beam 22 in a suitable manner. Said set of support wheels 23, 23a are arranged in a pair configuration, meaning that the respective support wheels 23, 23a in each pair configuration is arranged on opposite sides of said track support beam 22. The support wheel 23a arranged at the very rear of the track support beam 22 also has a track tension wheel function and is constituted by a tension wheel.

The suspension device S comprises a bogie arrangement 50 viewed in FIGS. 3a and 3b. The bogie arrangement 50 is configured to be rotatably attached to the vehicle body, not shown, of the tracked vehicle, about an axis of rotation Z1 transversal to the longitudinal extension of said track assembly 21 and attached to said track support beam 22 in connection to two fastening points P1, P2 so that the track support beam 22 is allowed to rotate in a rotational plane extending along the longitudinal extension X of said track support beam 22 about said axis of rotation Z0. Said bogie arrangement is rotatably attached to said vehicle body at a single fastening point, not shown here (see e.g. FIG. 4a) for said axis of rotation Z0.

Said two fastening points P1, P2 are arranged at a distance from each other along the longitudinal extension X of the track support beam 22 at essentially the same level in connection to the track support beam 22 with regard to the extension Y of the track support beam orthogonal to the longitudinal extension X and transversal extension Z of the track support beam 22, i.e. essentially the same horizontal level along the track support beam 22 when the track assembly is horizontally arranged on the ground.

Said two fastening points P1, P2 comprises a front fastening point P1 arranged in connection to a front portion of the track support beam 22 and a rear fastening point P2 arranged in connection to a rear portion of the track support beam 22.

The track support beam 22 comprises a front element 22a comprising said front fastening point P1 and a rear element 22b comprising said rear fastening point P2. Said front element 22a and rear element 22b constitute integrated parts of said track support beam 22 arranged between two longitudinal beams of the track support beam 22 and arranged to project from an upper portion of said longitudinal beams within the circumference of the endless track surrounding the track support beam 22.

Said bogie arrangement 50 comprises two bogie arms 52, 54 pivotably connected to each other and rotatably attached to a respective fastening point of said two fastening points P1, P2 of said track support beam 22 so that said bogie arms 52, 54 are allowed to move relative to each other in said rotational plane. Said bogie arrangement 50 is thus an articulated bogie arrangement.

Said two bogie arms 52, 54 are configured to be rotatably attached to the vehicle body in said fastening point of the vehicle body via an axle 56. The bogie arm configuration 50 thus comprises two bogie arms 52, 54, a front bogie arm 52 and a rear bogie arm 54. The front bogie arm 52 is rotatably connected to said axle 56 at an end portion 52a of said first bogie arm 52 and is extending essentially perpendicular relative to and away from said axle 56. The second bogie arm 54 is according to this embodiment rotatably connected to said axle 56 at an end portion 54a of said second bogie arm 54 and is extending essentially perpendicular relative to and away from said axle 56. The first bogie arm 52 and second bogie arm 54 are configured to be rotatable about said axel 56 in essentially the same rotational plane and thus about said axis of rotation Z0.

The front bogie arm 52 is rotatably attached to the front fastening point P1 in the front element 22a of the track support beam 22 at an opposite end portion 52b of said front bogie arm 52. The front bogie arm 52 is rotatably connected to the front fastening point P1 about an axis Z1.

The rear bogie arm 54 is rotatably attached to the rear fastening point P2 in the rear element 22b of the track support beam 22 at an opposite end portion 54b of said rear bogie arm 54. The rear bogie arm 54 is rotatably connected to the rear fastening point P2 about an axis Z2.

The front bogie arm 52 is arranged to extend forwardly along the longitudinal extension of said track support beam 22 from its end portion 52a rotatably connected to said axle 56 to its opposite end portion 52b rotatably connected to said front fastening point P1 of the track support beam 22.

The rear bogie arm 54 is arranged to extend rearwardly along the longitudinal extension of said track support beam from its end portion 54a rotatably connected to said axle 56 to its opposite end portion 56b rotatably connected to said rear fastening point P2 of the track support beam 22.

Said articulated bogie arrangement 50 comprises distance adjustment means for allowing a distance change between said front fastening point P1 in the track support beam 22 and said fastening point in the vehicle body and thus in this embodiment also the axle 56 for facilitating allowance of movement of said bogie arms 52, 54 relative to each other in said rotational plane.

According to this embodiment said distance adjustment means comprises a crank throw configuration 58 for said rotatable attachment of said other end portion 52b of the front a bogie arm 52 and said front fastening point P1.

The crank throw configuration 58 comprises a first link member 58a rotatably connected to the opposite end portion 52b of the front bogie arm 52, a second link member 58b connected to said front element 22a of the track support beam 22, and a crank member 58c at one end portion rotatably connected to the first link member 58a and at an opposite end portion rotatably connected to said front element 22a of the track support beam 22 via the second link member 58b about said axis of rotation Z1.

The front bogie arm 52 is thus rotatably connected to the front fastening point P1 about said axis Z1 via said crank throw configuration 58. The front bogie arm 52 is thus rotatably connected to the first link member 58a about an axis Z1a. The axis of rotation Z1 and axis of rotation Z1a are essentially parallel and at a distance from each other corresponding to the distance between the first link member 58a and second link member 58b in their axial connection points in the crank member 58c.

The suspension device S comprises or constitutes a track assembly suspension configuration.

Said suspension device S further comprises a suspension configuration 60 which according to this embodiment is constituted by a gas hydraulic suspension configuration 60. The gas hydraulic suspension configuration 60 is arranged for damping the movement of said bogie arrangement 50 and hence the movement of the track assembly 21 relative to the vehicle body.

The gas hydraulic suspension configuration 60 is further arranged for controlling the position of the bogie arrangement and hence the position of the track assembly relative to the vehicle body.

As shown in e.g. FIG. 4a-d said gas hydraulic suspension configuration 60 is configured to be arranged between the vehicle body and said bogie arms 52, 54 for damping the movement of said at least one bogie arm and controlling the position of said at least one bogie arm in said rotational plane.

Said gas hydraulic suspension configuration 60 comprises according to this embodiment a pair of hydraulic cylinders 62, 64 for the respective track assembly 21 of the tracked vehicle. Said pair of hydraulic cylinders 62, 64 comprises a front hydraulic cylinder 62 arranged to be connected between the front bogie arm 52 and a front fastening point of the vehicle body and a rear hydraulic cylinder 64 arranged to be connected between the rear bogie arm 54 and a rear fastening point of the vehicle body.

The front hydraulic cylinder 62 is at one end portion rotatably attached to the front bogie arm 52 about an axis Z3a and at an opposite end portion configured to be rotatably attached to vehicle body about an axis Z3b. The rear hydraulic cylinder 64 is at one end portion rotatably attached to the rear bogie arm 54 about an axis Z4a and at an opposite end portion configured to be rotatably attached to said vehicle body about an axis Z4b.

As shown in FIG. 4a, the front hydraulic cylinder 62 is at one end portion rotatably attached to a fastening point P3a of the front bogie arm 52 and at an opposite end portion rotatably attached to said front fastening point P3b of the vehicle body 30. The rear hydraulic cylinder 64 is at one end portion rotatably attached to a fastening point P4a of the rear bogie arm 54 and at an opposite end portion rotatably attached to said rear fastening point P4b of the vehicle body 30.

The respective track assembly of the tracked vehicle thus comprises such a gas hydraulic suspension configuration 60 comprising pair of hydraulic cylinders 62, 64.

According to an embodiment said front and rear hydraulic cylinders 62, 64 of the gas hydraulic suspension configuration consist respectively of a hydro-pneumatic combined spring and damper means comprising a hydraulic piston cylinder device and a gas spring device communicating with the hydraulic piston cylinder device via a restricting member.

Said front and rear hydraulic cylinders 62, 64 are arranged to be coupled to each other such that hydraulic flow is distributed between the front and rear hydraulic cylinders based on the force acting on the front and rear hydraulic cylinder 62, 64, respectively. Said hydraulic flow is arranged to be distributed such that the one of said front and rear hydraulic cylinders 62, 64 that absorbs the relatively higher force is compressed and the other is correspondingly expanded by hydraulic flow flowing from one of the hydraulic cylinders to the other 62, 64. FIG. 5b describes this in more detail.

As shown e.g. in FIG. 4a-d and FIG. 1, said vehicle body 30; 30, 32 is arranged to support vehicle structures.

As shown in FIG. 1 with the example of an articulated tracked vehicle 10 with two vehicle units 11, 12, said vehicle body 30 is arranged for connection to and suspension of said two opposite track assemblies 21, i.e. said track assembly pair 20, via said suspension device S comprising said bogie arrangement 50 and gas hydraulic suspension configuration 60 as described above with reference to FIGS. 3a-b and 4a. The two track assemblies 21 of the track assembly pair 20 are arranged on opposite sides of the vehicle body 30 so that the vehicle body 30 is arranged in between said track assemblies 21 of the track assembly pair 21 and such that the main direction of extension of the vehicle body 30 is substantially parallel to the main direction of extension of the respective track assembly 21 of the track assembly pair 20. The same applies to the rear vehicle unit 12.

The tracked vehicle comprises a support wheel suspension configuration configured to resiliently attach said support wheels 23, 23a to said track support beam 22. The support wheel suspension configuration is according to an embodiment comprised in said suspension device S. Said support wheel suspension configuration comprises rocker arms 26 connecting said plurality of support wheels 23, 23a with said track support beam 22. Said rocker arms 26 are configured such that forces acting on said plurality of support wheels 23, 23a cause resilient oscillation of said rocker arms 26. The resilient function of the support wheel suspension configuration of said track assembly will be described in more detail with reference to FIG. 5a-c.

The tension wheels 23a have a slightly different type of suspension than the other support wheels 23. Each tension wheel 23a is suspended by means of a track tension arrangement attached to a rubber bushing similar to the rubber bushings to which the other support wheels 23 are attached. Thereby, the tension wheel attachment acts as a rocker arm. The tension wheels 23a are, similar to the other support wheels 23, contacting the ground via the endless track during normal operation of the vehicle.

FIG. 4a-d schematically illustrate side views of a tracked vehicle 11 with a suspension device S with different positions of the vehicle body 30 relative to the track assembly 21. The tracked vehicle 11 is travelling on a ground G.

The tracked vehicle 11 is according to an embodiment constituted by the vehicle unit 11 of the articulated vehicle 10 in FIG. 1. The tracked vehicle 11 may also be a standalone vehicle.

The tracked vehicle 11 thus comprises a track assembly pair with right and left track assemblies of which the left track assembly 21 is shown. The tracked vehicle comprises said suspension device S. Said track assembly 21 is arranged to be supported by said vehicle body 30 by means of said suspension device S. Said track assembly comprises a track support beam 22 for supporting a drive wheel 24 and a plurality of road wheels 23, 23a, an endless track 25 being disposed around said wheels 23, 23a, 24.

The suspension device S comprise said bogie arrangement 50, described in more detail with reference to FIG. 3a-b. Said bogie arrangement 50 is rotatably attached to a single fastening point P0 of said vehicle body 30 about an axis of rotation transversal to the longitudinal extension of said track assembly 21 and attached to said track support beam 22 in connection to two said front fastening point P1 via said front bogie arm 52 and a rear fastening point P2 via said rear bogie arm 54 so that the track support beam 22 is allowed to rotate in a rotational plane extending along the longitudinal extension of said track support beam 22 about said axis of rotation.

Said suspension device S further comprises said gas hydraulic suspension configuration comprising said front hydraulic cylinder 62 rotatably attached to said fastening point P3a of the front bogie arm 52 and rotatably attached to said front fastening point P3b of the vehicle body 30 and said rear hydraulic cylinder 64 rotatably attached to said fastening point P4a of the rear bogie arm 54 and rotatably attached to said rear fastening point P4b of the vehicle body 30.

FIG. 4a schematically illustrates a side view of the tracked vehicle 11 with a suspension device S where the vehicle body 30 is raised relative to the track assembly 21. Said gas hydraulic suspension configuration is controlled such that the front and rear hydraulic cylinders 62, 64 are expanded so that the vehicle body 30 is raised relative to the track assembly, said bogie arm configuration 50 allowing said raising of the vehicle body 30. Said bogie arm configuration 50 thus allows said raising of the vehicle body 30 relative to said track assembly 21 and hence track support beam 22 and said thereby supported at least one drive wheel 24 and plurality of road wheels 23, 23a in a plane extending in the longitudinal direction of said track assembly 21 essentially orthogonal to the transversal extension of said track assembly 21.

FIG. 4b schematically illustrates a side view of the tracked vehicle 11 in FIG. 4a where the vehicle body 30 is lowered relative to the track assembly 21. Said gas hydraulic suspension configuration is controlled such that the front and rear hydraulic cylinders 62, 64 are compressed so that the vehicle body 30 is lowered relative to the track assembly, said bogie arm configuration 50 allowing said raising of the vehicle body 30. Said bogie arm configuration 50 thus allows said lowering of the vehicle body 30 relative to said track assembly 21 and hence track support beam 22 and said thereby supported at least one drive wheel 24 and plurality of road wheels 23, 23a in a plane extending in the longitudinal direction of said track assembly 21 essentially orthogonal to the transversal extension of said track assembly 21.

FIG. 4c schematically illustrates a side view of the tracked vehicle 11 in FIG. 4a in an uphill slope of the ground G where the vehicle body 30 is tilted to a horizontal position relative to the track assembly 21. Said gas hydraulic suspension configuration is controlled such that the front hydraulic cylinder 62 is compressed and the rear hydraulic cylinder 64 is expanded so that the vehicle body 30 is lowered relative to a front portion of the track assembly 21 and raised relative to a rear portion of the track assembly, said bogie arm configuration 50 allowing said tilting of the vehicle body 30. Thus, the bogie arm configuration 50 according to the present invention here allows a tilting movement of the track assembly 21, including said at least one drive wheel 24 and plurality of road wheels 23, 23a, relative to the vehicle body in a plane extending in the longitudinal direction of said track assembly 21 essentially orthogonal to the transversal extension of said track assembly 21.

FIG. 4d schematically illustrates a side view of the tracked vehicle 11 in FIG. 4a in a downhill slope of the ground G where the vehicle body 30 is tilted to a horizontal position relative to the track assembly 21. Said gas hydraulic suspension configuration is controlled such that the front hydraulic cylinder 62 is expanded and the rear hydraulic cylinder 64 is compressed so that the vehicle body 30 is raised relative to a front portion of the track assembly 21 and lowered relative to a rear portion of the track assembly, said bogie arm configuration 50 allowing said tilting of the vehicle body 30. Thus, the bogie arm configuration 50 according to the present invention here allows a tilting movement of the track assembly 21, including said at least one drive wheel 24 and plurality of road wheels 23, 23a, relative to the vehicle body in a plane extending in the longitudinal direction of said track assembly 21 essentially orthogonal to the transversal extension of said track assembly 21.

Thus, as illustrated in FIGS. 4c and 4d, by allowing a tilting movement of the track assembly 21, including said at least one drive wheel 24 and plurality of road wheels 23, 23a, relative to the vehicle body, mobility is improved in that the vehicle body may be held essentially horizontal when driving in both uphill slopes and downhill slopes, thereby facilitating transport of cargo when driving in rough terrain, thus enabling increased productivity of a tracked work vehicle.

Figure 5A:
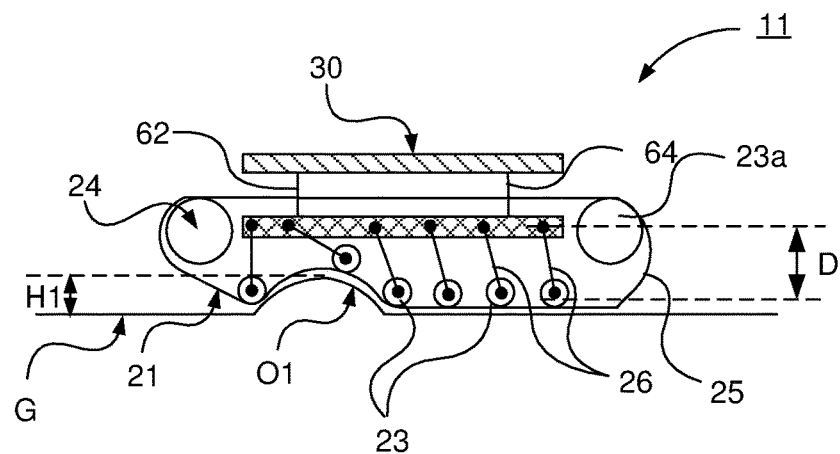
FIG. 5a schematically illustrates a side view of a vehicle unit with suspension device according to an embodiment of the present invention in a first suspension application.
Figure 5B:
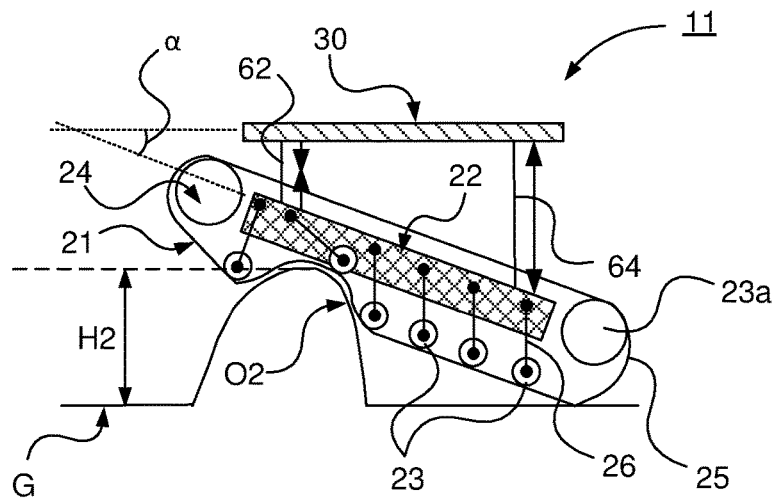
FIG. 5b schematically illustrates a side view of the vehicle unit in FIG. 5a in a second suspension application.

FIG. 5a schematically illustrates a side view of a vehicle unit 11/vehicle 11 with the suspension device according to an embodiment of the present invention in a first suspension application.

The vehicle unit 11 comprises track assemblies with support wheel suspension configurations and a vehicle body 30 connected to a gas hydraulic suspension configuration. The track assembly 21 has at least one drive wheel 24, a plurality of support wheels 23 and an endless track 25, wherein said drive wheel 24 and said plurality of support wheels 23 are rotatably secured to a track support beam 22 of the track assembly 21. The track support beam 22 is according to an embodiment constituted by a skid beam. Said drive wheel 24 is arranged to drive said endless track 25 running over said at least one drive wheel 24 and said plurality of support wheels 23.

Said support wheel suspension configuration comprises rocker arms 26, wherein the respective rocker arm 26 is connected to a support wheel 23 of said set of support wheels 23 to said skid beam kind of track support beam 22. Said rocker arms 26 are configured such that forces acting on said plurality of support wheels 23 cause resilient oscillation of said rocker arms 26.

Said rocker arms 26 are configured to oscillate between a first position such that a first distance is formed between the track support beam 22 and the support wheel 23 and a second bottomed position wherein said support wheel 23 bottoms out in relation to said track support beam 22. Said first position and second position of the rocker arm 26 form a distance D. The bottomed position is, according to one alternative, assumed when the skid beam kind of track support beam 22 is brought into contact with the endless track due to the support wheels 23, by means of said force, being pushed up along the side of the skid beam.

According to this suspension application, a vehicle unit 11 of a vehicle/a vehicle 11 travels over an obstacle O1 of a first type with a dimension reaching to a first height H1 above ground. Said first height H1 of the obstacle O1 is smaller than the vertical distance D between said first position of the rocker arm 26 and the second bottomed position. Said obstacle O1 has a first height H1 making the distance travelled by the rocker arm 26 relative to the first position less than the distance D, such that the rocker arm does not reach the bottomed position.

Thus, said support wheel suspension configuration of the suspension device is configured to oscillate such that said rocker arms 26 connected to the support wheels 23 travelling over the obstacle O1 oscillate resiliently due to the increasing force acting on the support wheels 23 travelling over the obstacle O1, such that these support wheels 23 are pushed up relative to the track support beam 22 of the track assembly 21, substantially corresponding to the height H1 of said obstacle O1. Thereby, the track support beam 22 and so the vehicle unit 11 is held substantially horizontal/in parallel with the ground plane G.

Generally, said gas hydraulic suspension configuration is configured to cooperate with said support wheel suspension configuration based on force acting on said track assembly pair. Said cooperation arises when force acting on said pair of track assemblies is absorbed by said support wheel suspension configuration and any remaining force transmitted to said track support beam is absorbed by said suspension configuration.

Consequently, the support wheel suspension configuration of the support wheels will cooperate with the gas hydraulic suspension configuration comprising said front and rear hydraulic cylinders 62, 64 when force during ground contact also is transferred to track support beam, i.e. when a certain pressure is applied to the track assembly during propulsion of the vehicle the support wheel suspension configuration and the gas hydraulic suspension configuration will cooperate.

Support wheels 23 of the support wheel suspension configuration do not have to bottom out in order for the gas hydraulic suspension configuration to cooperate resiliently. When driving the vehicle in a long inclined plane, several support wheels 23 of the support wheel suspension configuration will be resiliently influenced, whereby the pressure of the gas hydraulic suspension configuration is increased and cooperation with the support wheel suspension configuration takes place.

FIG. 5b schematically illustrates a side view of the vehicle unit 11 in FIG. 5a in a second suspension application. The suspension device comprises a bogie arrangement according to the present invention, e.g. a bogie arrangement 50 as described with reference to e.g. FIG. 3a-b.

According to this suspension application a vehicle 11/vehicle unit 11 of a vehicle travels over an obstacle O2 of a second type with a dimension reaching to a second height H2 above ground level, exceeding said first height H1 of the obstacle O1 of said first type illustrated in FIG. 5a. Said second height H2 of the obstacle O2 exceeds the vertical distance D between said first position of the rocker arm 26 and the second bottomed position.

Hereby, said support wheel suspension configuration of the suspension device is configured to oscillate such that said rocker arms 26 connected to support wheels travelling over the obstacle O2 of said second type oscillate resiliently due to the increasing force acting on the support wheels 23 traveling over the obstacle O2, such that these support wheels 23 are pushed up relative to the track support beam 22 of the track assembly 21 until said support wheel suspension configuration bottoms out, i.e. until one or more rocker arms 26 reaches its bottomed position.

When the height of the obstacle O2 of said second type exceeds the distance D between said first position of the rocker arm 26 and the second bottomed position, the track assembly will hereby rise when the support wheel suspension configuration bottoms out.

The gas hydraulic suspension configuration of the vehicle unit 11 is hereby configured to cooperate with said support wheel suspension configuration such that the hydraulic flow is redistributed between the front and rear hydraulic cylinders 62, 64 when said support wheel suspension configuration bottoms out, i.e. when one or more support wheels 23 of the support wheel suspension configuration bottoms out.

In this case, when the support wheel suspension configuration bottoms out by the rocker arm 26 being sprung to its bottomed position and the track assembly 21 rises, the force acting on the front hydraulic cylinder 62 will be greater than the force acting on the rear hydraulic cylinder 64 such that hydraulic medium is forced through said connection such that a hydraulic flow from the front hydraulic cylinder 62 to the rear hydraulic cylinder 64 is generated, whereby the front hydraulic cylinder 62 is compressed and the rear hydraulic cylinder 64 correspondingly expanded.

Thus, hydraulic flow is in this situation arranged to distributed such that the front and the hydraulic cylinder 62 that in this case absorbs a relatively larger force is compressed, and the rear hydraulic cylinder 64 is correspondingly expanded due to flow of hydraulic flow from the front hydraulic cylinder 62 to the rear hydraulic cylinder 64, wherein an angle $\alpha$ is formed between said track support beam 22 and said vehicle body 30.

The piston rod of the front hydraulic cylinder 62 is thus compressed due to the relatively larger force acting on the front region of the track assembly 21 adjacent to the front hydraulic cylinder 62, and the piston rod of the rear hydraulic cylinder 64 is correspondingly expanded through the increase in pressurised hydraulic medium supplied to the rear hydraulic cylinder 64.

Hereby, the vehicle unit 11 is held substantially horizontal/parallel relative to the ground plane G despite that the track assembly 21/track support beam 22 rises when passing over the obstacle O2 of said second type.

According to one embodiment, said first type of obstacle O1 is an obstacle having a height of about 200 mm, and said second type of obstacle O2 has a height of about 200-400 mm.

The suspension device thus provides, through said gas hydraulic suspension configuration, a bogie function in combination with said support wheel suspension for improved mobility and increased comfort. Furthermore, the load on the vehicle in form of vibrations, shocks and impacts are reduced.

Figure 5C:
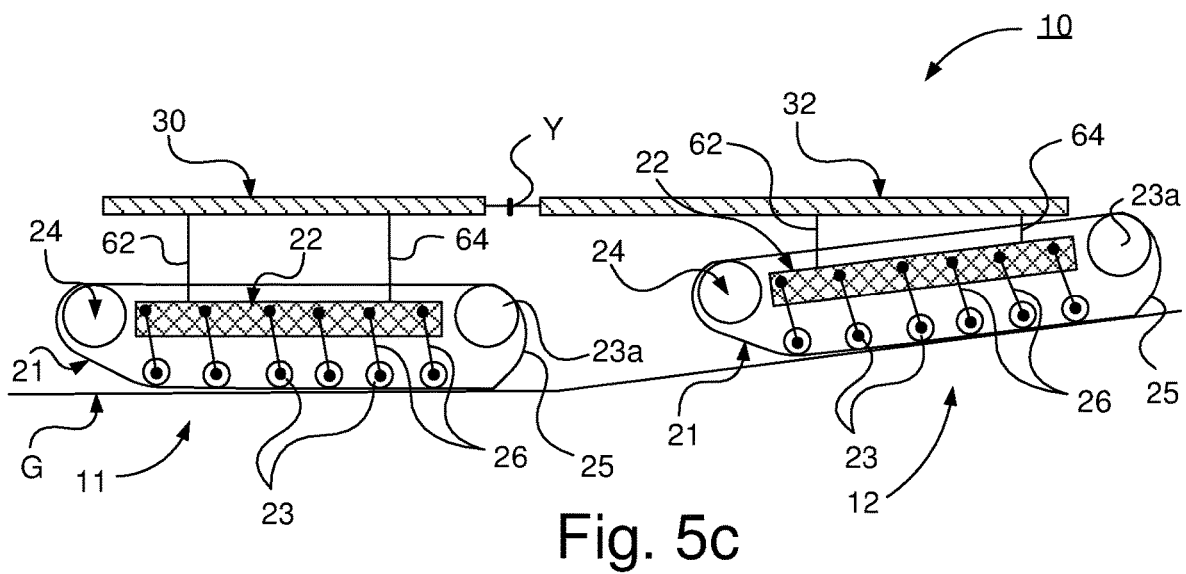
FIG. 5c schematically illustrates a side view of vehicle units with vehicle suspension device according to an embodiment of the present invention in a third suspension application.

FIG. 5c schematically illustrates a side view of vehicle units 11, 12 of an articulated vehicle 10 with a suspension device according to an embodiment of the present invention in a third suspension application. The suspension device comprises a bogie arrangement according to the present invention, e.g. a bogie arrangement 50 as described with reference to e.g. FIG. 3a-b. The vehicle 10 comprises herein a front vehicle unit 11 and a rear vehicle unit 12, pivotally connected to each other via a steering joint Y. The front and rear vehicle units 11, 12 comprise track assemblies 21 corresponding to the track assemblies of the vehicle unit 11 described with reference to FIGS. 5a and 5b, and corresponding suspension device comprising said gas hydraulic suspension configuration comprising front and rear hydraulic cylinders 62, 64. Each track assembly 21 of the each vehicle unit 11, 12 is supported by the respective vehicle body 30, 32 by means of a bogie arrangement according to the present invention, e.g. a bogie arrangement 50 as described with reference to e.g. FIG. 3a-b.

According to this suspension application the vehicle is traveling off-road, wherein the front vehicle unit 11 has levelled out and the rear vehicle unit 12 is in a downhill slope.

The suspension device comprises a, not shown, control unit configured to control said gas hydraulic suspension configuration based on information received from inclination determining means.

Said control unit is configured to control said gas hydraulic suspension configuration such that the position of the track assemblies 21 relative to the vehicle body 30, 32 is controlled to compensate for inclination. Hereby, according to this alternative, said front and rear hydraulic cylinders 62, 64 of the front vehicle unit 11 are regulated such that the vehicle body 30 is raised relative to its track assemblies 21 and said front hydraulic cylinder 62 of the rear vehicle unit 12, such that the front part of the vehicle body 32 of the rear vehicle unit 12 is raised relative the track assembly 21 and is horizontal, and said rear hydraulic cylinder 64 of the rear vehicle unit 12 is lowered relative to the track assembly such that the rear region of the vehicle body 32 is raised such that the vehicle body 32 is horizontal and such that the load-carrying frame 40 that protrudes above the front and rear vehicle unit 11, 12 is held substantially horizontal.

Figure 6:
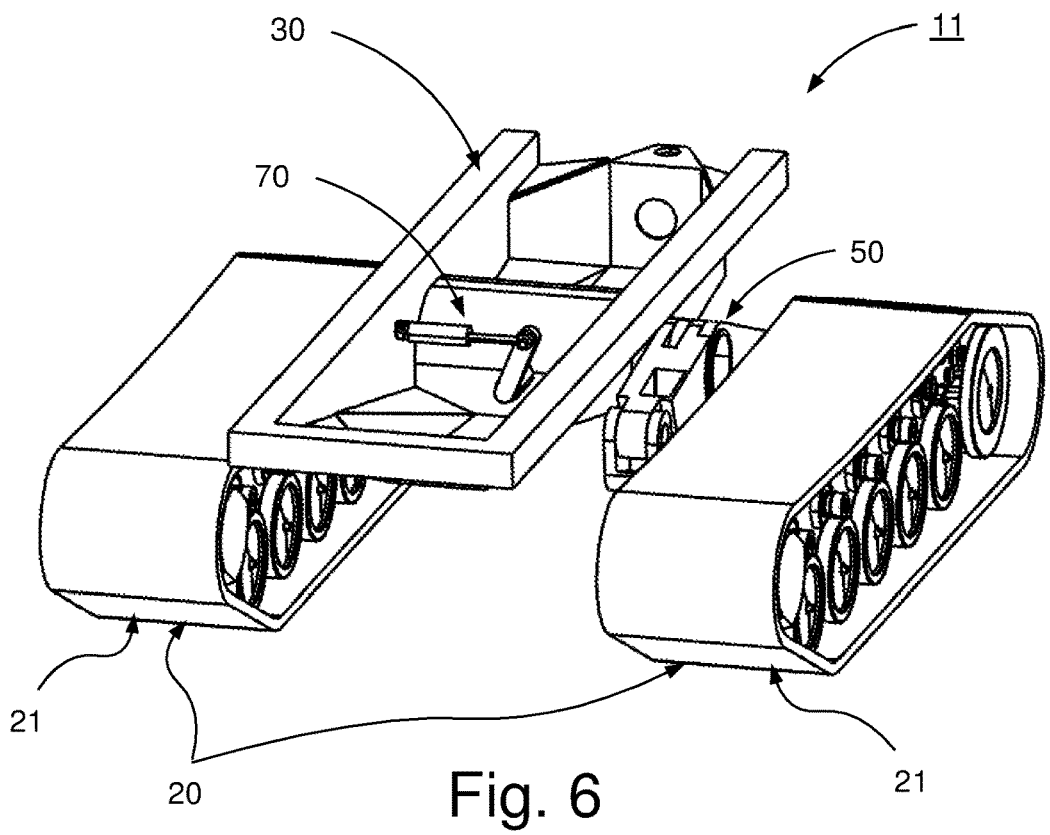
FIG. 6 schematically illustrates a perspective view of a tracked vehicle with a tilting arrangement according to an embodiment of the present invention.

FIG. 6 schematically illustrates a perspective view of a vehicle 11 with a tilting arrangement 70 according to an embodiment of the present invention. The vehicle 11 may be the vehicle unit 11 described e.g. with reference to FIG. 1 but without the cab for illustrative purposes. The tilting arrangement 70 is arranged in connection to the vehicle body 30 for facilitating tilting of the vehicle body 30 relative to the bogie arrangement 50 and track assembly pair 20 about an axis of rotation extending centrally in the longitudinal direction of the vehicle body 30 of the vehicle 11 as explained in more detail with reference to FIG. 8a-b.

Figure 7:
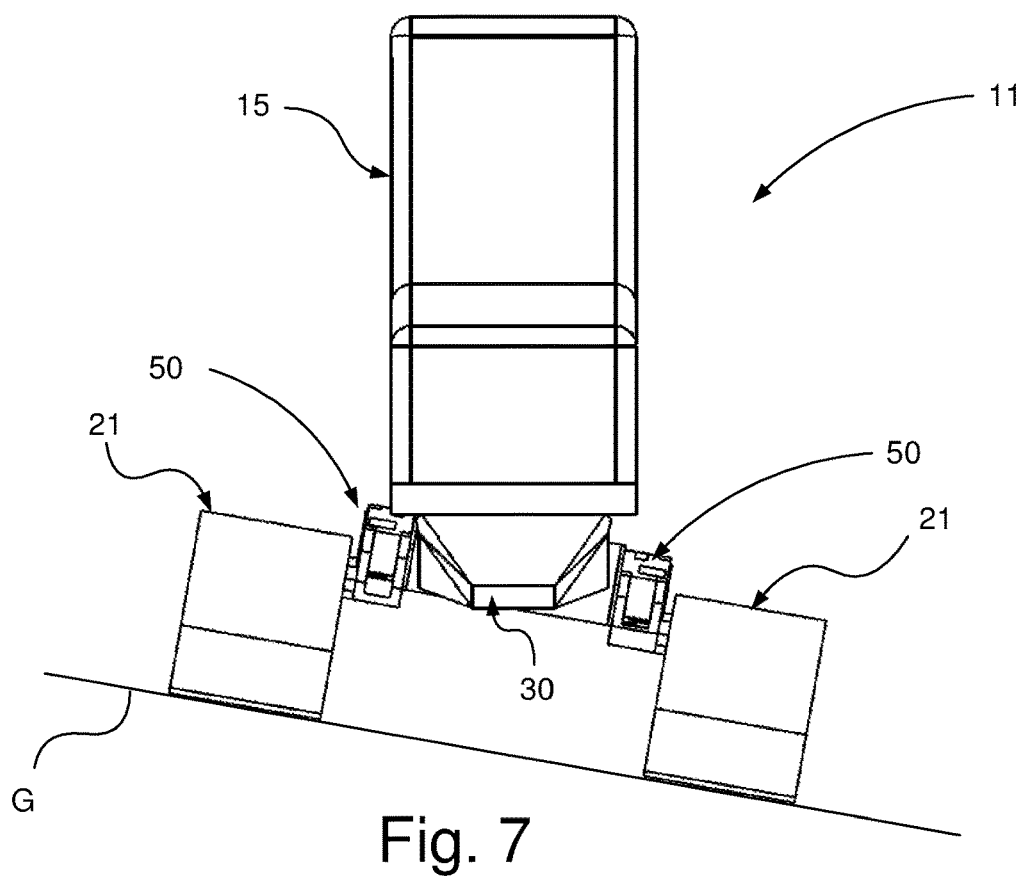
FIG. 7 schematically illustrates a front view of the tracked vehicle in FIG. 6 with said tilting arrangement.

FIG. 7 schematically illustrates a front view of the tracked vehicle 11 in FIG. 6 with said tilting arrangement 70, said vehicle here having a cab 15.

The vehicle 11 is positioned in a side slope of a ground G. Control of the tilting arrangement 70 enables the vehicle body 30 of the vehicle 11 and thus also the cab 15 of the vehicle to be kept substantially horizontal despite that track assemblies 21 of the vehicle are inclined with a side angle.

Figure 8A:
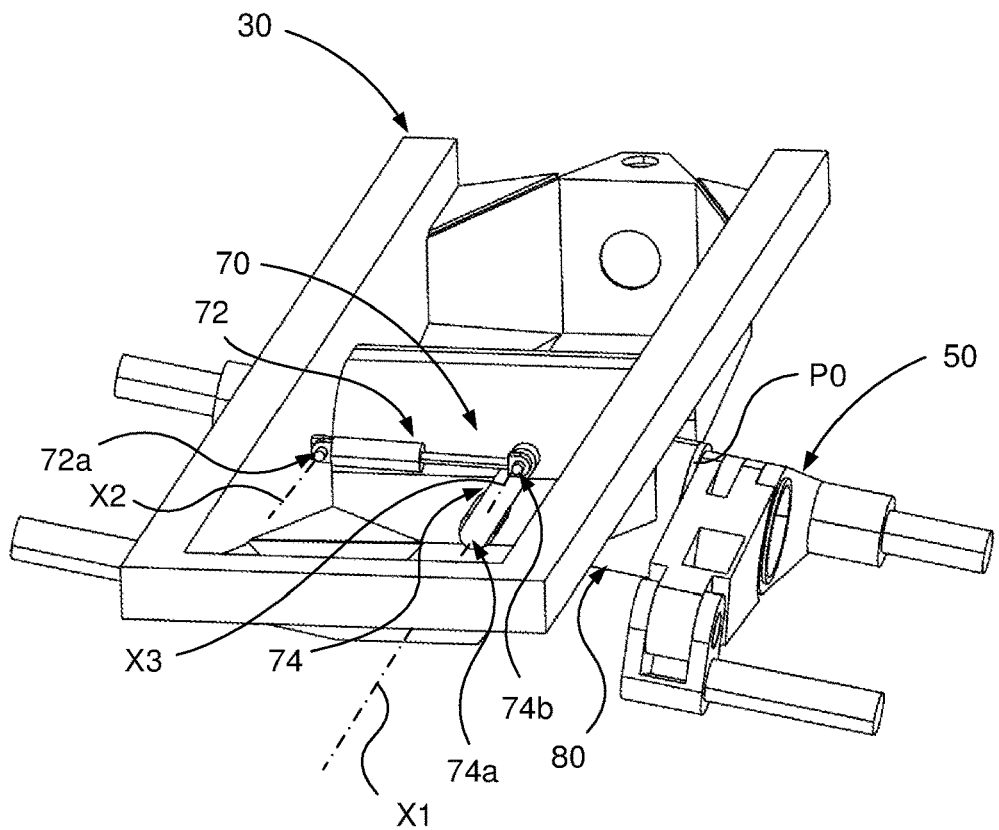
FIGS. 8a and 8b schematically illustrates perspective views of different tilting positions of the suspension device relative to the vehicle body by means of said tilting arrangement.
Figure 8B:
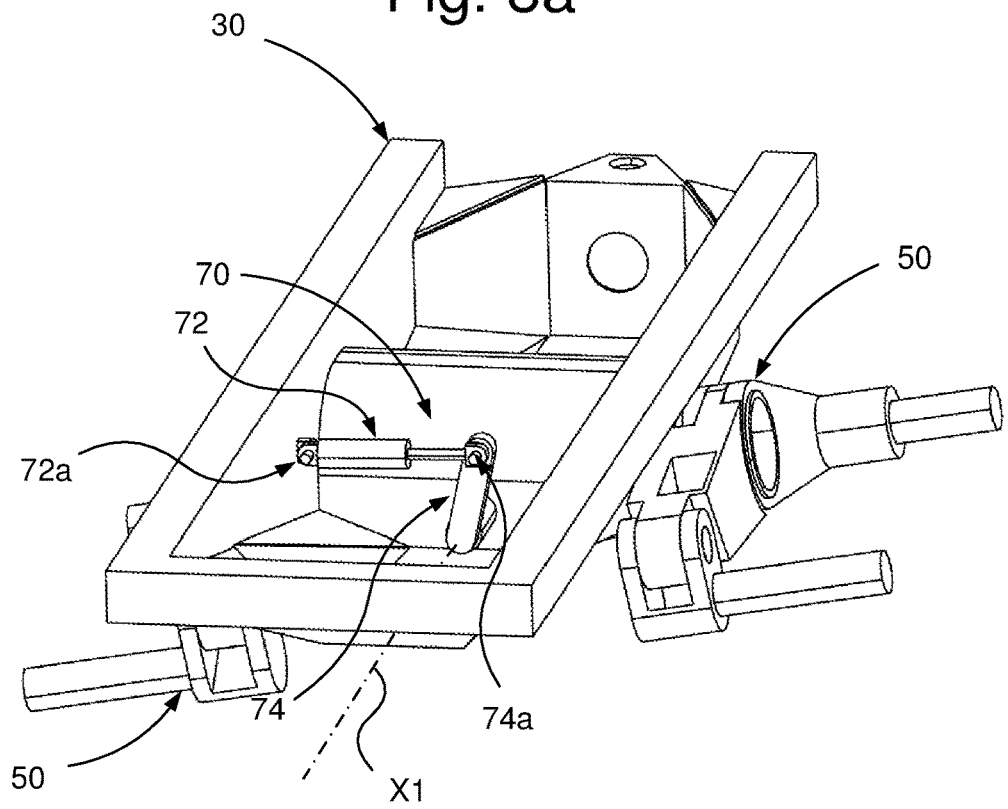

FIGS. 8a and 8b schematically illustrates perspective views of different tilting positions of the bogie arrangement 50 of the suspension device relative to the vehicle body 30 by means of said tilting arrangement.

The bogie arrangement 50 on the respective side of the vehicle are configured to be rotatably attached to a transversal connection member 80 comprising said attachment point P0 for the respective bogie arrangement 50.

The connection member 80 is thus extending transversally relative to the longitudinal extension of the vehicle body 30. The connection member 80 comprises or is connected to the axle 56 of the respective bogie arrangement 50. The connection member 80 is rotatably attached to the vehicle body 30 about an axis of rotation X1 extending centrally along the longitudinal extension of the vehicle body 30.

The tilting arrangement 70 comprises a hydraulic cylinder 72 rotatably attached at one end portion to a fastening point 72a in the vehicle body 30 about an axis of rotation X2 extending longitudinally along a side portion of the vehicle body 30.

The tilting arrangement 70 further comprises a tilting arm 74 attached at one end portion to said transversal connection member 80 via said vehicle body 30 at an attachment point 74a being centrally arranged in a lower portion of the vehicle body 30. Said tilting arm 74 is rotatably arranged relative to the vehicle body 30 at said attachment point 74a about said axis of rotation X1 extending centrally along the longitudinal extension of the vehicle body 30.

The tilting arm 74 of the tilting arrangement 70 is rotatably attached to the hydraulic cylinder 72 at an attachment point 74b about an axis of rotation X3 extending along the longitudinal extension of the vehicle body 30.

By extending and compressing said hydraulic cylinder 72 said tilting arm 74 and thus said transversal connection member 80 is pivoted about said axis X1.

The tilting arrangement 70 is thus arranged in connection to the vehicle body 30 for facilitating tilting of the vehicle body 30 relative to the bogie arrangement 50 and track assembly pair 20 about said axis of rotation X1 by extending and compressing said hydraulic cylinder as illustrated in FIGS. 8a and 8b.

Figure 9:
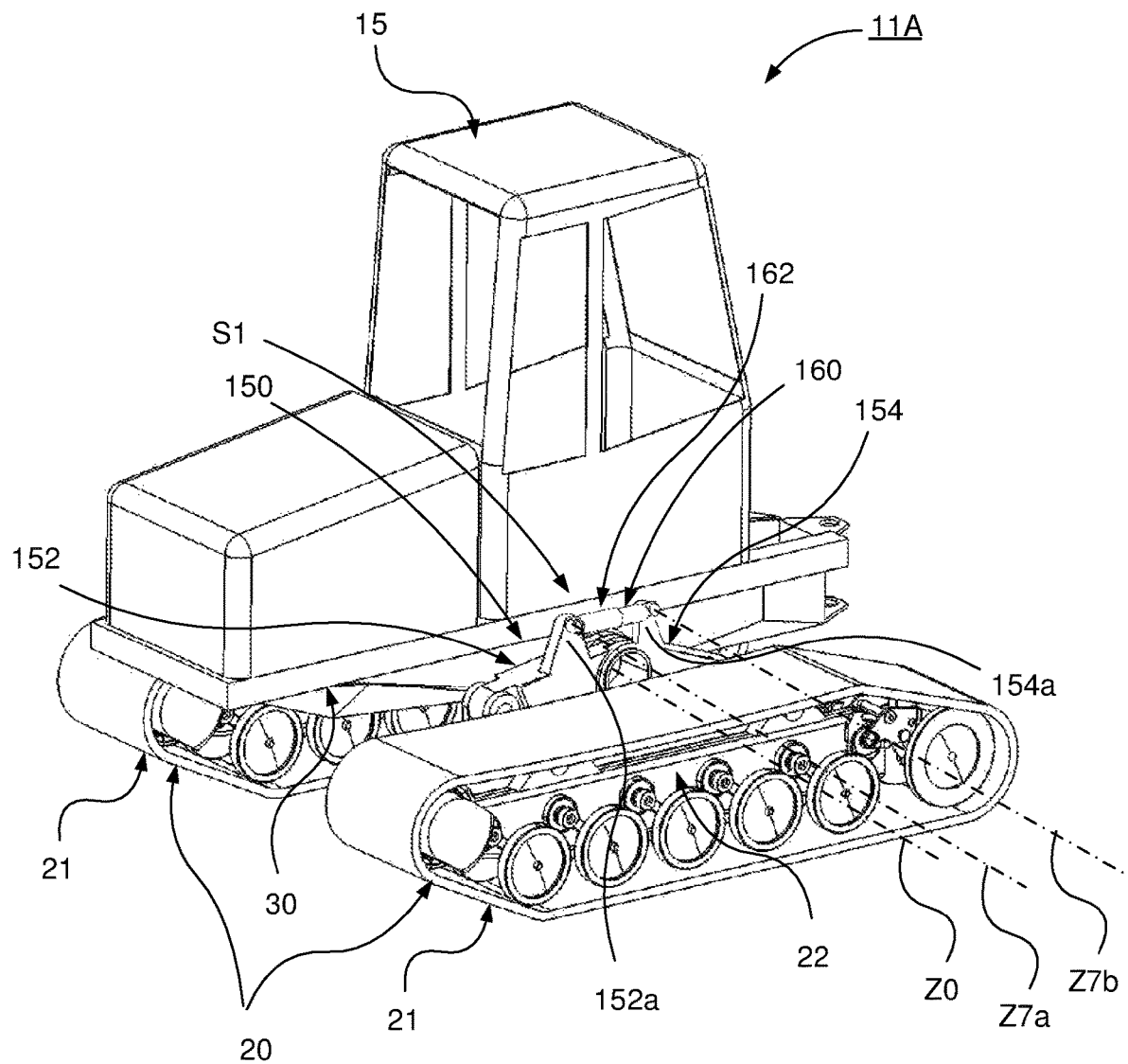
FIG. 9 schematically illustrates a perspective view of a tracked vehicle with a suspension device according to an embodiment of the present invention.

FIG. 9 schematically illustrates a perspective view of a tracked vehicle 11A with a suspension device S1 according to an embodiment of the present invention.

The vehicle 11A only differs from the vehicle 11/vehicle unit 11 described above regarding the suspension device S1. The vehicle thus has a vehicle body 30, a vehicle cab 15 and a track assembly pair 20 with a left and right track assembly 21, said track assemblies 21 being supported by said vehicle body 30 by means of said suspension device S1. The respective track assembly 21 comprises a track support beam 22 for supporting a plurality of road wheels and a drive wheel, an endless track being disposed around said road wheels.

The suspension device S1 comprises a bogie arrangement 150. The bogie arrangement 150 according to this embodiment has essentially the same configuration and is configured to be attached between vehicle body 30 and the track assemblies in accordance with the bogie arrangement 50 described above with reference to e.g. FIG. 3a-b.

The bogie arrangement 150 according to this embodiment thus configured to be rotatably attached to the vehicle body 30 of the tracked vehicle, about an axis of rotation Z0 transversal to the longitudinal extension of said track assembly 21 and attached to said a track support beam 22 of said track assembly in connection to two spaced apart fastening points so that the track support beam is allowed to rotate in a rotational plane extending along the longitudinal extension of said track support beam about said axis of rotation.

Said bogie arrangement 150 comprises two bogie arms 152, 154, a front bogie arm 152 and a rear bogie arm 154, pivotably connected to each other. The front bogie arm 152 is rotatably attached to a front fastening point of said two fastening points and the rear bogie arm 154 is rotatably attached to a rear fastening point of said two fastening points of said track support beam so that said bogie arms 152, 154 are allowed to move relative to each other in said rotational plane.

Said articulated bogie arrangement 150 comprises also distance adjustment means for allowing a distance change between said front fastening point in the track support beam 22 and said fastening point in the vehicle body for facilitating allowance of movement of said bogie arms 152, 154 relative to each other in said rotational plane. Said distance adjustment means may comprise a crank throw configuration in accordance with the embodiment of the bogie arrangement 50 described e.g. in FIG. 3a-b.

Said suspension device S1 further comprises a suspension configuration 160 which according to this embodiment is constituted by a gas hydraulic suspension configuration 160.

The gas hydraulic suspension configuration 160 is arranged for damping the movement of said bogie arrangement 150 and hence the movement of the track assembly 21 relative to the vehicle body 30.

The gas hydraulic suspension configuration 160 is further arranged for controlling the position of the bogie arrangement 150 and hence the position of the track assembly 21 relative to the vehicle body 30.

Said suspension configuration 160 is arranged between said two bogie arms 152, 154 for damping the movement of said at bogie arms 152, 154 and controlling the position of said at bogie arms 152, 154 in said rotational plane.

Said gas hydraulic suspension configuration 160 comprises according to this embodiment a hydraulic cylinder 162 for the respective track assembly 21 of the tracked vehicle. Said hydraulic cylinder 162 is arranged to be connected between the front bogie arm 152 and the rear bogie arm 154. The front bogie arm 152 comprises a connection portion 152a projecting upwardly from said front bogie arm 152 and the rear bogie arm correspondingly has a connection portion 154a projecting upwardly from said rear bogie arm 154. The hydraulic cylinder 162 is at one end portion rotatably attached to the connection portion 152a of the front bogie arm 152 about an axis of rotation Z7a and at an opposite end portion rotatably attached to the connection portion 154a of the rear bogie arm 154 about an axis of rotation Z7b. Said axis of rotation Z7a and Z7b are extending in the transversal direction relative to the longitudinal extension of the track assembly 21.

By thus controlling the hydraulic cylinder 162 by expanding and compressing the hydraulic cylinder 162 the front and rear bogie arms 152, 154 may be moved relative to each other about said axis of rotation Z0 so that the vehicle body 30 may be raised and lowered relative to the respective track assembly 21.

Above there has been described a suspension device having a suspension configuration constituted by a gas hydraulic suspension configuration. The gas hydraulic suspension configuration comprises either a pair of hydraulic cylinders 62, 64 arranged between the bogie arm arrangement 50 and the vehicle body as described e.g. with reference to FIG. 3a-b or a single hydraulic cylinder 162 arranged between the bogie arms 152, 154 of the bogie arrangement 150 as described with reference to FIG. 9.

According to an alternative embodiment, the suspension configuration is constituted by a mechanical suspension configuration, for example in accordance with a mechanical suspension configuration of a car, wherein cylinders are constituted by mechanical struts which according to one alternative comprises helical spring members.

According to an alternative embodiment, the suspension configuration is constituted by an air suspension configuration, for example in accordance with an air suspension configuration of a truck.

The foregoing description of the preferred embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated.

The invention claimed is:

1. A tracked vehicle comprising a vehicle body, at least one track assembly and a suspension device, wherein said track assembly is arranged to be supported by said vehicle body by means of said suspension, said track assembly comprising a track support beam for supporting a plurality of road wheels, an endless track being disposed around said road wheels, wherein said suspension device comprises a bogie arrangement rotatably attached to a fastening point of said vehicle body about an axis of rotation transversal to the longitudinal extension of said track assembly and attached to said track support beam in connection to at least two fastening points so that the track support beam is allowed to rotate in a rotational plane extending along the longitudinal extension of said track support beam about said axis of rotation wherein said bogie arrangement comprises two bogie arms pivotably connected to each other and rotatably attached to a respective fastening point of said at least two fastening points of said track support beam so that said bogie arms are allowed to move relative to each other in said rotational plane and wherein said bogie arrangement comprises distance adjustment means for allowing a distance change between at least one of said fastening points in the track support beam and said fastening point in the vehicle body for facilitating said allowance of movement of said bogie arms relative to each other in said rotational plane.

2. The tracked vehicle according to claim 1, wherein said two bogie arms in one of their respective end portions are rotatably attached to the vehicle body in said fastening point of the vehicle body such that they are rotatable relative to each other about said axis of rotation and in their respective other end portions are rotatably attached to a respective fastening point of said at least two fastening points in the track support beam, about a respective axis of rotation transversal to the longitudinal extension of said track assembly.

3. The tracked vehicle according to claim 1, wherein said adjustment means comprises a crank throw configuration for at least one of said rotatable attachments of said other end portion of a bogie arm and a fastening point of said at least two fastening points.

4. The tracked vehicle according to claim 1, wherein said adjustment means comprises a slide configuration for at least one of said rotatable attachments of said other end portion of bogie arm and a fastening point of said at least two fastening points.

5. The tracked vehicle according to claim 1, wherein said suspension device further comprises a suspension configuration for damping the movement of said bogie arrangement and hence the movement of the track assembly relative to the vehicle body and/or for controlling the position of the bogie arrangement and hence the position of the track assembly relative to the vehicle body.

6. The tracked vehicle according to claim 5, wherein said suspension configuration is arranged between the vehicle body and at least one of said two bogie arms for damping the movement of said at least one bogie arm and/or controlling the position of said at least one bogie arm in said rotational plane.

7. The tracked vehicle according to claim 5, wherein said suspension configuration is arranged between said two bogie arms for damping the movement of said at bogie arms and/or controlling the position of said at bogie arms in said rotational plane.

8. The tracked vehicle according to claim 5, wherein said suspension configuration comprises at least one hydraulic cylinder.

9. The tracked vehicle according to claim 1, wherein said tracked vehicle is an articulated vehicle comprising a first vehicle unit and a second vehicle unit pivotably connected to the first vehicle unit via an articulation joint, each of said vehicle units comprising a vehicle body and two track assemblies connected to respective sides of said vehicle body by means of a suspension device comprising said bogie arrangement.

10. The tracked vehicle according to claim 1, wherein said tracked vehicle is a forestry vehicle.

11. The tracked vehicle according to claim 1, wherein said tracked vehicle is a forwarder.

* * * * *